United States Patent [19]

Wun

[11] Patent Number: 4,936,669
[45] Date of Patent: Jun. 26, 1990

[54] REARVIEW MIRROR DEVICE FOR VEHICLE

[76] Inventor: Su-Chin Wun, No. 642-1, Shin-Shing Rd. Wu-Jin Hsiang, Taichung Hsien, Taiwan

[21] Appl. No.: 364,061

[22] Filed: Jun. 8, 1989

[51] Int. Cl.$^5$ .................................. G02B 5/08
[52] U.S. Cl. .................................. 350/604; 350/637; 350/639; 248/479
[58] Field of Search ............... 350/604, 605, 632, 637, 350/639; 248/476, 479, 480

[56] References Cited

U.S. PATENT DOCUMENTS

| | | | |
|---|---|---|---|
| 3,390,937 | 7/1968 | Nicholson | 350/604 |
| 3,937,563 | 2/1976 | Frabe | 350/604 |
| 4,469,405 | 9/1984 | Chin-Wun | 350/604 |

Primary Examiner—Bruce Y. Arnold
Assistant Examiner—Jay Ryan
Attorney, Agent, or Firm—Christie, Parker & Hale

[57] ABSTRACT

A rearview mirror device for a vehicle includes a mirror assembly provided in a housing, an arm holding the mirror assembly and mounted movably in the housing, and a moving and controlling mechanism which has a motor mounted in the housing and a screw rod connected to the motor and the movable arm. The arm can be moved into and out of the housing by the motor through the screw rod. The device can be mounted on the rear side of the vehicle so that the driver can be provided with a complete view of the rear of the vehicle and the vehicle can be backed up safely and easily.

7 Claims, 6 Drawing Sheets

4,936,669

REARVIEW MIRROR DEVICE FOR VEHICLE

BACKGROUND OF THE INVENTION

This invention relates to a rearview mirror device for a vehicle, and particularly to a rearview mirror device which has a mirror assembly held by a movable arm which is controlled by a motor.

An object of the invention is to provide a rearview mirror device which is adapted to be mounted on the rear side of a vehicle to provide the driver with a complete view of the area directly to the rear of the vehicle which could never be obtained with a conventional rearview mirror. With this device, the vehicle can be backed up safely and easily.

Another object of the invention is to provide a rearview mirror device adaptable to be mounted on the rear side of a vehicle and controllable from the front side of the vehicle.

SUMMARY OF THE INVENTION

According to the present invention, a rearview mirror device for a vehicle comprises a housing, a means for mounting the housing on the vehicle, a mirror assembly provided in the housing, an arm means holding the mirror assembly and mounted movably in the housing, and a means for moving and controlling the arm means, including a motor mounted in the housing and means for connecting the motor to the arm means.

In one aspect of the invention, the housing is elongated in the direction from the front to the rear side of the vehicle, and has a rear opening. The connecting means includes a rotary screw rod which is connected to the motor and extends longitudinally in the housing, and a sleeve member provided around the screw rod for moving along the axis of the screw rod when the motor is operated. The sleeve member is connected to the arm means, and the arm means is movable between a first position in which the mirror assembly is moved into the housing and a second position in which the mirror assembly extends outwardly of the housing.

In another aspect of the invention, the arm means includes a front arm portion and a rear arm portion hinged to the front arm portion which enables the arm means to move downward relative to the front arm portion, the front arm portion being pivoted to the sleeve member for turning about a vertical axis. The arm means may further include a means for limiting the downward movement of the rear arm portion.

In still another aspect of the invention, a slide channel is provided in the housing, the slide channel extending parallelly to the screw rod and having a rear channel portion which inclines the screw rod at a predetermined angle.

In still another aspect of the invention, a switch member is provided in the housing, the switch member being tuned off when the sleeve member moves rearward and comes into contact therewith. A stop member is provided on the rear arm portion, the stop member touching the switch member when the mirror assembly is moved into the housing.

In still another aspect of the invention, the housing is further provided with a rear cover which is connected to the mirror assembly so that the cover is opened when the mirror assembly is moved outward and is closed when the mirror assembly is moved inward.

The present exemplary preferred embodiment will be described in detail in accordance with the following drawings, in which:

DETAILED DESCRIPTION OF THE PREFERRED EMBODIMENT

Figure 1:
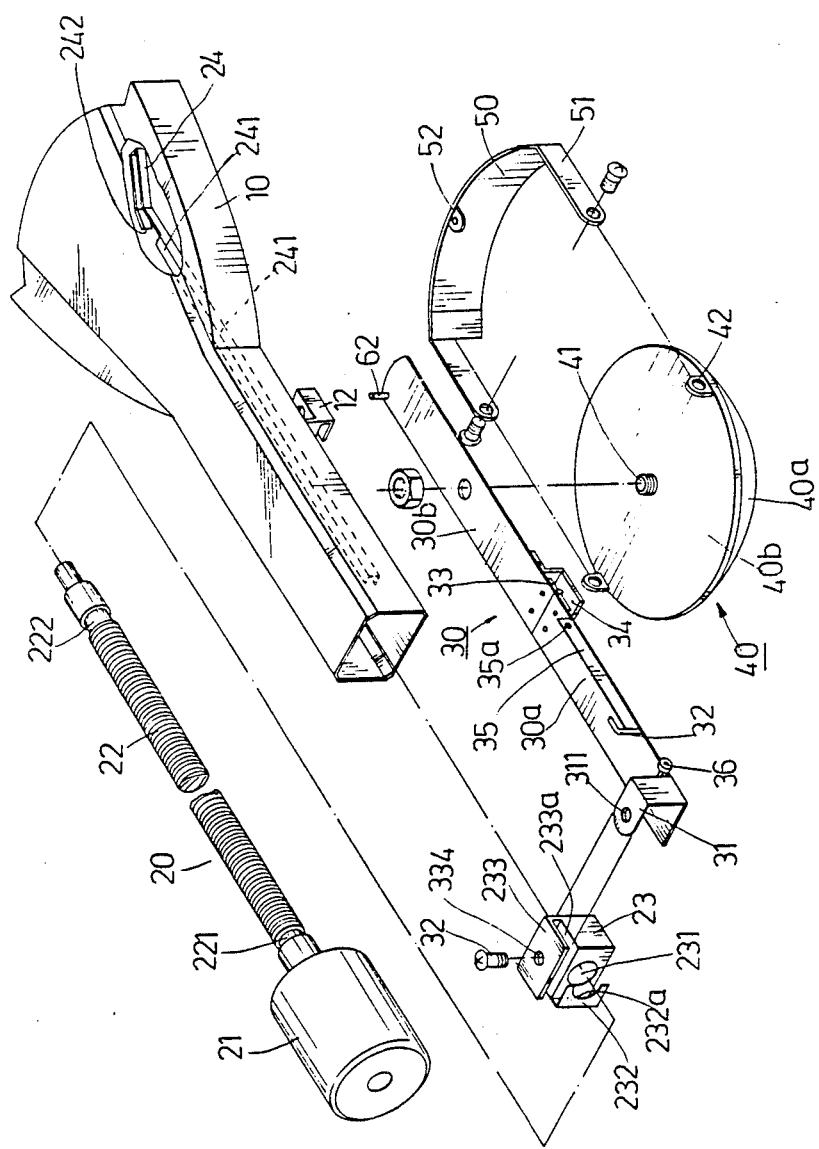
FIG. 1 is an exploded view of a rearview mirror device according to the present invention.

Referring to the drawings, a rearview mirror device according to the present invention is shown, including a housing 10, a control mechanism 20, an adjustable arm 30, a rearview mirror assembly 40 and a movable cover plate 50.

Figure 9:
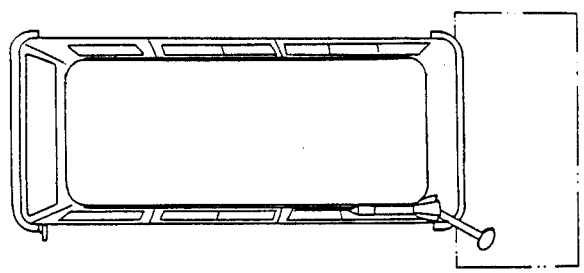
Figure 10:
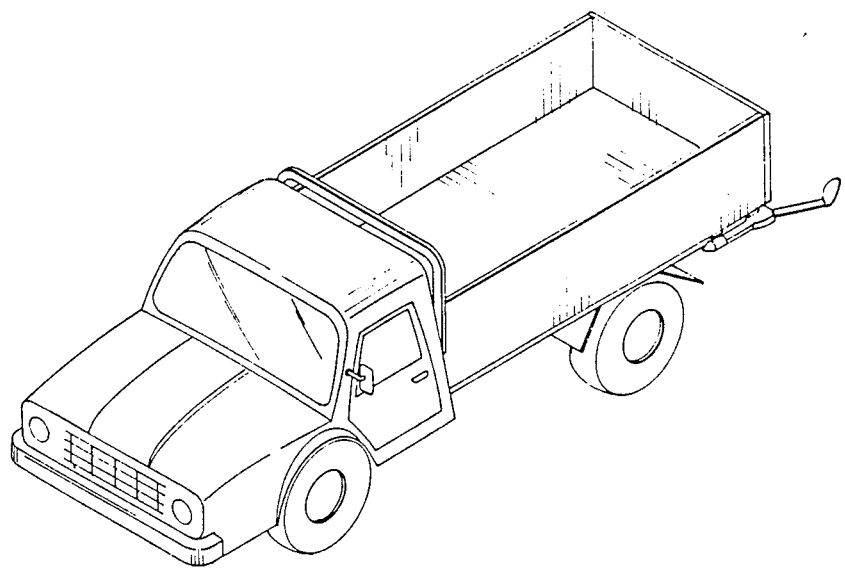

The housing 10 is metallic and is provided with front and rear mounting legs 11, 12. The mounting legs 11, 12 are generally U-shaped and are adapted to be mounted on a rainwater diverting flange provided on the top of a vehicle body on the driver side of the vehicle as shown in FIGS. 9 and 10, or mounted to the bottom side of the vehicle body as shown in FIG. 11. The U-shaped legs 11, 12 can be held firmly against the vehicle's body by screw coupling.

The control mechanism 20 is provided in a front portion of the housing 10 and includes a reversible motor 21. To the shaft of the motor 21 is connected a screw rod 22. A movable sleeve member 23 which is in the form of a block with a rectangular cross-section is sleeved on the screw rod 22.

A cylindrical bore 231 is provided in the sleeve member 23 to receive the screw rod 22. An engaging plate 232 extends forwardly from the sleeve member 23 and has a curved engaging edge 232a to engage with the thread of the screw rod 22. When the motor 21 is operated, the screw rod moves the engaging plate 232, thereby also moving the sleeve member 23. The sleeve member 23 also has a top flank 233 which confines a clamping groove 233a with the top side of the sleeve member 23. A screw hole 334 is provided in the flank 233 for the attachment of a clamping screw 32.

Figure 2:
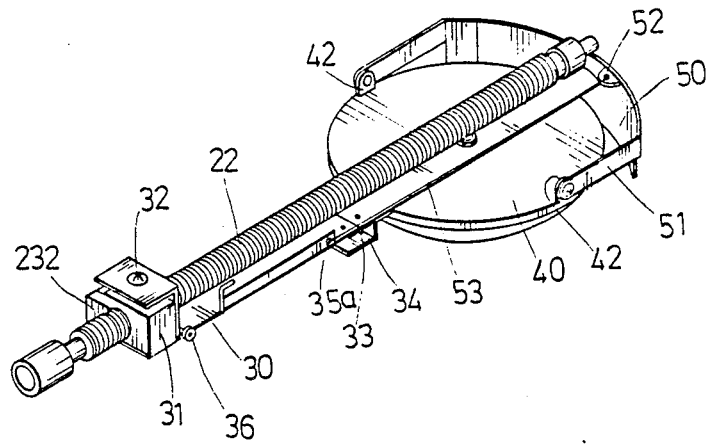
FIG. 2 is a perspective view of the rearview mirror device excluding the housing and the motor.
Figure 3:
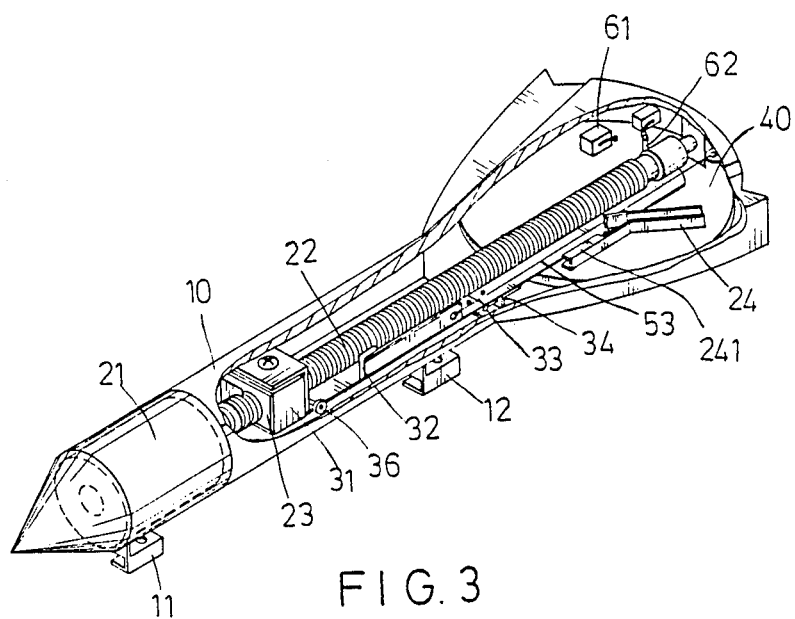
FIG. 3 is a perspective, partially sectioned view of the rearview mirror device.
Figure 4:
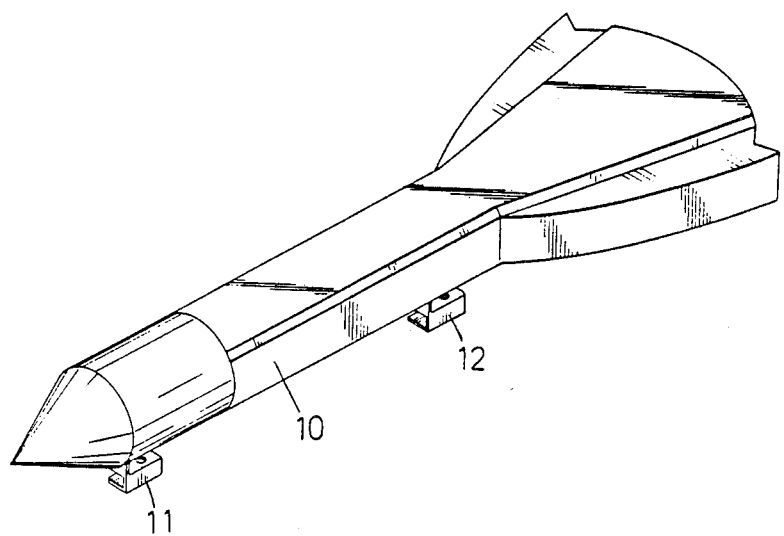
FIG. 4 is a perspective view of the rearview mirror device.
Figure 5:
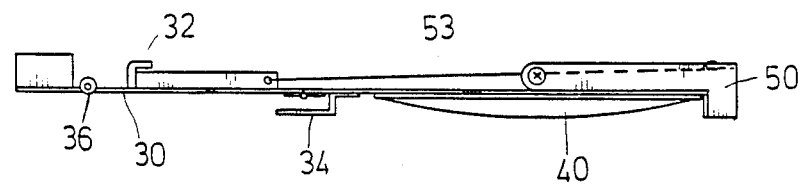
FIGS. 5 and 6 are elevation views of the rearview mirror device excluding the motor and the housing in different position.
Figure 6:
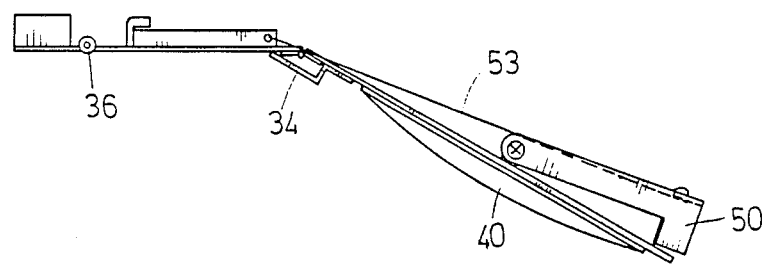

The adjustable arm 30 is connected to the movable sleeve member 23 as shown in FIGS. 2 and 3. The arm 30 has a front portion 30a and a rear portion 30b which are connected movably to one another by means of a hinge 33. A substantially L-shaped plate 34 is attached to the bottom side of the rear portion 30b adjacent to the hinge 33 so as to adjust the angle between the front and rear portions 30a and 30b of the arm. At the front end of the front portion 30a is an angled connecting plate 31 which is inserted in the clamping groove 233a of the sleeve member 23. A pivot member 32 passes through the hole 334 of the flank 233 and the hole 311 of the angled plate 31 and is screwed in the sleeve block 23, thereby connecting movably the arm 30 to the sleeve member 23. It can be noted that the rear portion 30b of the arm 30 is movable upward and downward relative to the front portion 30a and that the entire arm 30 is turnable about the pivot 32. Also, the arm 30 can be moved backward or forward together with the sleeve member 23. In order to guide the movement of the arm 30, a slide channel 241 with an inclined channel portion 24 is provided on a bottom wall of the housing 10. A roller 36 is attached to the front portion 30a of the arm 30 and received in the slide channel 241.

The mirror assembly 40 includes a convex mirror 40a and a mirror back 40b. The mirror back 40b is provided with a screw member 41 to secure the mirror back 40b to the rear portion 30b of the arm 30. A rear cover 50 is connected to the mirror assembly 40 by means of two arms 51 which are pivoted to two lugs 42 of the mirror back 40b. The rear cover 50 closes the housing 10 when the mirror assembly 40 is moved into the housing 10. A lug 52 is provided on the rear cover 50 and is connected with a cord 53 which in turn is connected to a hole 35a of a flange 35 of the arm 30. The cord 53 so arranged is used for limiting the downward movement of the rear arm portion 30b caused due to the weight of the mirror assembly 40. Adjacent to the flange 35 of the arm 30 is provided a hook member 32 to hook up the top edge 242 of the channel 241 when the mirror assembly 40 extends outward. The hook member 32 serves as an auxiliary bearing support in addition to the sleeve member 23 when the mirror assembly 40 is moved outward.

Figure 8:
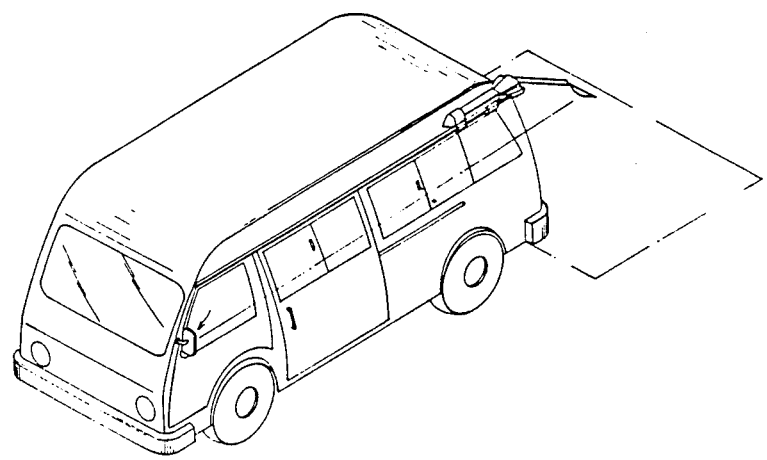
FIGS. 8, 9 and 10 show how the rearview mirror device is mounted on a vehicle.

The device described above can be mounted on the back of the body of a vehicle as shown in FIGS. 8, 9, and 10. Preferably, the device is mounted on the driver's side of the vehicle. The mirror assembly 40 can provide the driver a complete view of the area directly to the vehicle's rear when the vehicle is to be backed up. The motor 21 can be operated by the driver from the driver's seat of the vehicle.

Figure 7:
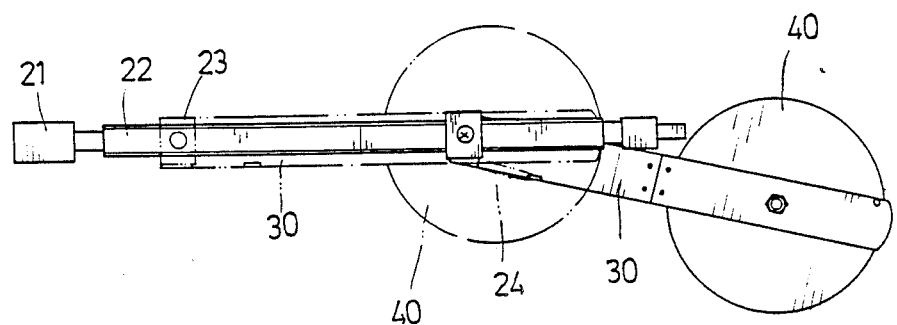
FIG. 7 is a plan view showing two positions of the mirror assembly.

When the motor 21 is switched on, the sleeve member 23 moves the arm 30 outwardly of the housing 10. In this situation, the rear portion 30b of the arm 30 bends downward due to the weight of the mirror assembly 40. However, the arm portion 30b bends only to a predetermined position due to the restraining effect of the cord 53. When the roller 36 of the arm 30 reaches the inclined channel portion 24, the arm 30 turns a predetermined angle so that the mirror assembly 40 moves from a position directly facing the rear of the vehicle to an inclined position which permits the driver to look the mirror assembly without the obstruction of the vehicle body. The two positions of the mirror assembly 40 are shown in FIG. 7.

The operation of the motor is stopped by a switch 61 provided in the housing 10. The switch 61 is turned off upon contact by the sleeve member 23, which reaches the switch when the arm 30 turns. After use, the arm can be moved in the housing 10 by operating the motor from the driver's seat. When the mirror assembly 40 is entirely moved into the housing 10, a stop member 62 which is provided on the rear arm portion 30b touches the switch 61, thereby switching off the motor 21.

For safety purposes, the screw rod 22 is further provided with two annular grooves 221, 222 respectively at the front and rear ends of the screw rod 22. These grooves 221, 222 limit the movement of the sleeve member 23 when the switch 61 fails to work so that the sleeve member cannot move beyond the front or rear end of the screw rod 22.

With the invention thus explained, it is apparent that various modifications and variations can be made without departing from the scope of the invention. It is therefore intended that the invention be limited only as indicated in the appended claims.

What I claim is:

1. A rearview mirror device for a vehicle comprising:
   a housing elongated in the direction from the front to the rear side of the vehicle and having a rear opening;
   means for mounting said housing on the vehicle;
   a mirror assembly provided in said housing;
   an arm means holding said mirror assembly and mounted movably in said housing;
   means for moving and controlling said arm means, including a motor mounted in said housing and connecting means for connecting said motor to said arm means;
   said connecting means including a rotary screw rod which is connected to said motor and extends longitudinally in said housing, and a sleeve member provided around said screw rod for moving along the axis of said screw rod when said motor is operated, said sleeve member being connected to said arm means, said arm means being movable between a first position in which said mirror assembly is moved into said housing and a second posiiton in which said mirror assembly extends outwardly of said housing; and
   wherein said arm means includes a front arm portion and a rear arm portion hinged to said front arm portion for moving downward relative to said front arm portion, said front arm portion being pivoted to said sleeve member for turning about a vertical axis.

2. A rearview mirror device as claimed in claim 1, wherein said arm means further includes means for limiting the downward movement of said rear arm portion.

3. A rear view device as claimed in claim 2, further comprising a slide channel provided in said housing, said slide channel extending parallelly to said screw rod and having a rear channel portion which inclines said screw rod at a predetermined angle.

4. A rearview mirror device as claimed in claim 3, further comprising a switch member provided in said housing, said switch member being turned off when said sleeve member moves rearward and touches said switch member.

5. A rearview mirror device as claimed in claim 4, further comprising a stop member provided on said rear arm portion, said stop member touching said switch member when said mirror assembly is moved into said housing.

6. A rearview mirror device as claimed in claim 5, further comprising a rear cover provided at the rear side of said housing, said cover being connected to said mirror assembly.

7. A rearview mirror device as claimed in claim 5, wherein said screw rod has two opposite ends which are provided respectively with two annular grooves to limit the movement of said sleeve member.

* * * * *

UNITED STATES PATENT AND TRADEMARK OFFICE
CERTIFICATE OF CORRECTION

PATENT NO. : 4,936,669
DATED : June 26, 1990
INVENTOR(S) : Su-Chin Wun

It is certified that error appears in the above-identified patent and that said Letters Patent is hereby corrected as shown below:

Column 1, line 5, change "rcarview" to -- rearview --.
Column 1, line 58, change "tuned" to -- turned --.

Column 3, line 48, after "look" insert -- at --.

In the Claims

Column 4, line 28, change "posiiton" to -- position --.

Signed and Sealed this

Fourteenth Day of January, 1992

Attest:

HARRY F. MANBECK, JR.

*Attesting Officer*  *Commissioner of Patents and Trademarks*